United States Patent [19]

Connors

[11] Patent Number: 4,613,055

[45] Date of Patent: Sep. 23, 1986

[54] FUEL TANK CAP COVER

[76] Inventor: Arthur F. Connors, 2496 Baltusrol Ct., Union City, Calif. 94587

[21] Appl. No.: 748,690

[22] Filed: Jun. 25, 1985

[51] Int. Cl.⁴ ............................................. B65D 25/00
[52] U.S. Cl. ................................... 220/210; 220/85 P
[58] Field of Search ............ 220/210, 256, 259, 85 F, 220/85 SP, 86 AT, DIG. 33, 159, 85 P; 70/159, 160

[56] References Cited

U.S. PATENT DOCUMENTS

| | | | |
|---|---|---|---|
| 1,944,535 | 1/1934 | White | 70/159 |
| 2,201,521 | 5/1940 | Cook et al. | 220/85 P |
| 3,394,836 | 7/1968 | Millard | 220/210 |
| 3,930,388 | 1/1976 | Barras | 70/159 |
| 4,030,628 | 6/1977 | Hippert, Jr. | 220/85 P |
| 4,254,888 | 3/1981 | Chandler | 220/210 X |
| 4,313,321 | 2/1982 | Wasser | 220/210 X |
| 4,370,919 | 2/1983 | Wagner et al. | 220/210 X |

Primary Examiner—Steven M. Pollard
Attorney, Agent, or Firm—T. R. Zegree

[57] ABSTRACT

A cap cover for a truck fuel tank filler pipe comprises a base ring secured by a hinge to an annular cover. A pair of cooperating lugs secured to the base ring and to the annular cover, respectively, are provided with aligned holes therein for passage of a padlock which locks the cap cover thereby preventing theft of fuel from the tank.

12 Claims, 6 Drawing Figures

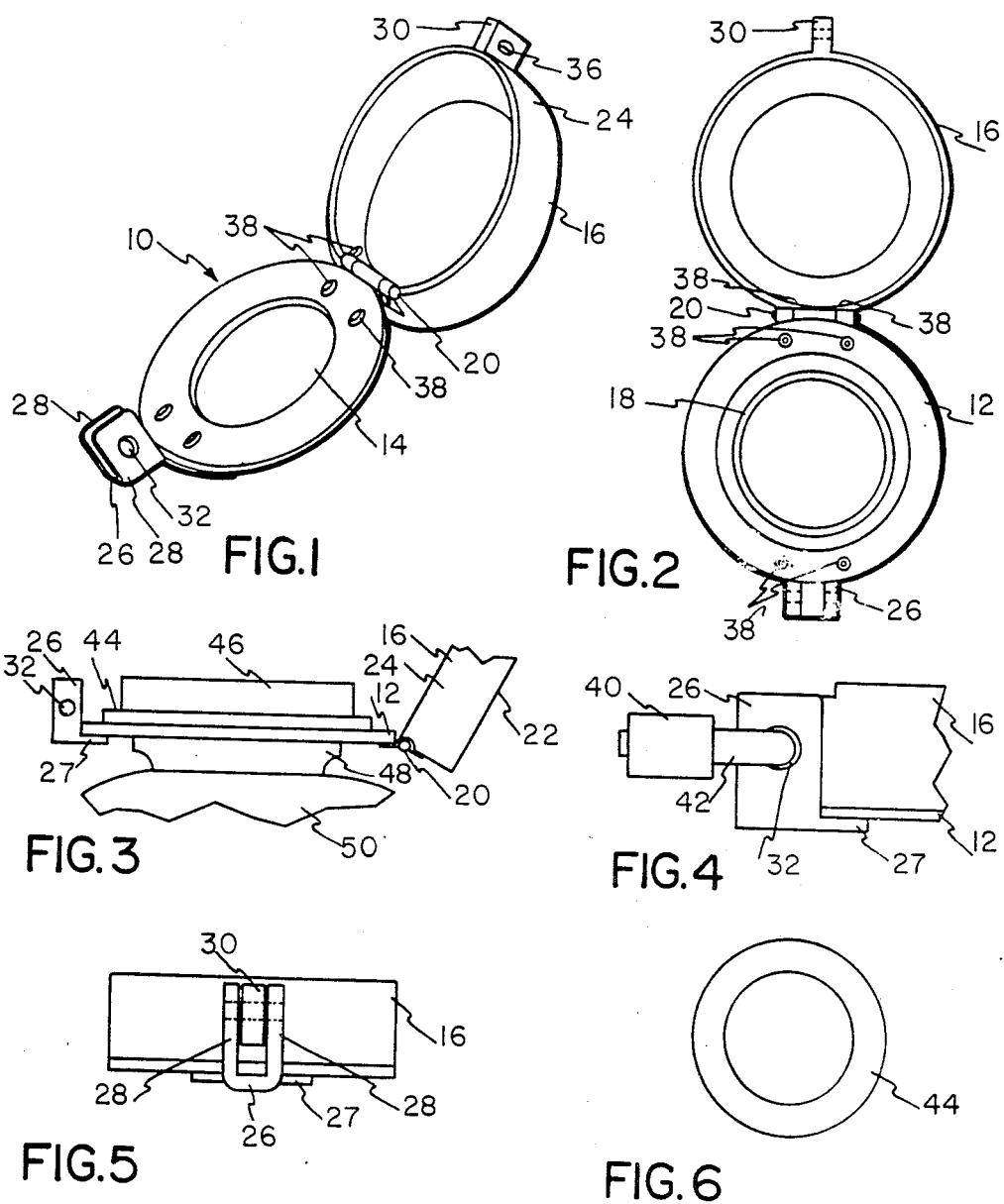

FUEL TANK CAP COVER

BACKGROUND OF THE INVENTION

The present invention relates generally to an improved cap cover for a fuel tank. More particularly, the invention relates to a cap cover for use on end portion of a fuel tank of a truck for the specific purpose of preventing theft of liquid fuel from the tank by siphoning or other means.

Various types of anti-theft devices for use on filler pipes of automobiles and other vehicles have been described in the patent literature. For example, U.S. Pat. No. 1,778,989 to Thomas describes a gasoline tank cap lock comprising a split clamping ring encircling the neck below the threaded portion thereof. U.S. Pat. No. 1,897,185 to Bruning teaches a lock of gasoline tanks comprising a split collar and a bolt which, when tightened, clamps securely the collar around the neck of the fuel tank. U.S. Pat. No. 1,989,300 to Webb illustrates an automobile fuel tank cap connected to a bar, the free end of which being in the form of an eye adapted to receive a shackle of a padlock. U.S. Pat. No. 3,979,933 to Mohrhoff discloses a clamp which encircles the filler pipe of a fuel tank below the filler cap and a pair of vertical standards through which a shackle of a padlock is inserted. U.S. Pat. No. 4,030,628 to Hippert describes a two-piece cover having a pair of collars detachably secured by fasteners about the spout of a container. U.S. Pat. No. 4,326,641 to Wilken discloses an anti-theft device for liquid fuel tank comprising a tubular member for insertion in the tank filler tube, the lower end of which is formed into a grid. U.S. Pat. No. 4,438,862 to Bona shows an anti-theft device for fuel tanks comprising a star-shaped body having planar radial vanes disposed in different planes.

While the aforementioned patents disclose the general concept of devices having different forms for preventing stealing of gasoline from vehicle tanks, it appears that such devices have not generated sufficient interest in the trucking industry, inasmuch as it is estimated that merely 2% of trucks on the road today are equipped with some sort of an anti-theft device, the preponderant majority of trucks being unprotected and thus available for siphoning fuel by unscrupulous persons. In fact, it has been observed that a large increase of gasoline theft from truck tanks has occurred in the last few years due to increased price of fuel and occasional shortages thereof. Thus, it is apparent that there exists a need for a protective device for fuel tanks which would be readily acceptable by the trucking industry.

The cap cover of this invention provides a new approach to the structure of such device which offers certain advantages over the prior art devices and thus it gives an opportunity to large interstate common carrier trucking companies as well as to independent truck drivers to save substantial amounts of money by preventing frequently occurring thefts of their fuel.

OBJECTS OF THE INVENTION

In view of the foregoing, it is the principal object of the present invention to provide a sturdy, anti-theft device for truck tanks which prevents stealing of liquid fuel therefrom.

Another object of the invention is to provide a durable, one-piece cap cover of a simplified construction which can easily and rapidly be installed around the neck of a filler pipe of a gasoline tank.

Still another object of the invention is to provide a device of the character described which can be manufactured in volume quantities at a low cost from readily available materials.

BRIEF SUMMARY OF THE INVENTION

These and other objects of the invention will become more fully apparent from the following description when considered in conjunction with the accompanying drawings.

In accordance with the invention, there is provided a cap cover adapted to be fitted over a neck of upper portion of a fuel tank filler pipe of a truck to prevent unauthorized withdrawal of fuel from said tank, comprising: a base ring including a large central aperture therein; an annular cover including a top wall and a side wall hingedly secured to said base ring, the outside diameter of said side wall being substantially equal to the outside diameter of said base ring; a first U-shaped lug member secured to said base ring and projecting outwardly therefrom comprising a pair of spaced, vertically disposed arms; a second lug member secured to said side wall of said annular cover projecting outwardly therefrom and adapted for insertion between said arms of said first lug member; and an opening in each of said arms of said first lug member and in the second lug member, said openings being aligned when said cap cover is in the closed position.

BRIEF DESCRIPTION OF THE DRAWINGS

The invention will now be more fully described with reference to the accompanying drawing wherein like reference characters designate corresponding elements throughout the views thereof.

FIG. 1 is a perspective view of the cap cover of this invention in the open position;

FIG. 2 is a plan view of the cap cover likewise in the open position showing the base ring disposed around the fuel tank neck;

FIG. 3 is a side elevation view of the cap cover in the open position with certain portions broken away showing an adjustment ring disposed between the cap and the base ring;

FIG. 4 is a somewhat enlarged view of a portion of the base ring with portions of the cap cover broken away showing a lug member and a padlock in the locked position;

FIG. 5 is a front side elevation view of the cap cover in the closed position; and FIG. 6 is a plan view of the adjustment ring.

DETAILED DESCRIPTION OF THE INVENTION

Referring now to the drawing, a rigid, removable, unitary cap cover 10, as illustrated in its preferred embodiment in FIGS. 1 and 2, comprises essentially a one-piece unit including a flat base ring 12 having a large circular central aperture 14 therein, the diameter of which is slightly larger than the outside diameter of filler pipe neck of a fuel tank which has to pass freely through aperture 14. A cover 16 is secured by standard hinge means 20 to base ring 12 in such a manner that it can easily be moved by hand to the open or closed position. Hinge means 20 is attached securely to side wall 24 of cover 16 and base ring 12 in any suitable manner, such as by rivets 38. Cover 16 comprises a flat, circular top wall 22 and a cylindrical side wall 24 positioned at a right angle relative thereto and surrounding the perimeter thereof. The height of side wall 24 is somewhat greater than the height of a cap of a fuel tank to be covered when cap cover 10 is placed in the closed position over the upper edge 18 of threaded filler pipe neck connected to a fuel tank.

A first substantially U-shaped lug member 26 firmly secured to base ring 12 projects outwardly and upwardly therefrom in a direction perpendicular to the plane thereof. Lug 26 comprises a pair of vertically extending arms 28 arranged in parallel relationship to each other and provided with aligned transverse openings 32 and 34 in the central portion thereof. Lug 26 may be affixed to base ring 12 in any convenient manner. For example, it may include a base plate 27 of semicircular configuration extending inwardly at a right angle from the bottom portion of the U, the base plate 27 being firmly secured to the underside of base ring 12 by suitable fastening means, such as rivets 38 or by welding. It may likewise be affixed to base ring 12 as a one-piece element during molding operation if the cap cover is fabricated from a plastic material.

A second lug member 30 projecting outwardly from side wall 24 of cover 16 is adapted for insertion into the space between arms 28 of first lug member 26. Second lug member 30 includes a transverse opening 36 in the central portion thereof arranged in such a way that when cap cover 10 is in the closed position with lug member 30 placed between arms 28 of lug member 26, openings 32, 34 and 36 are all aligned to receive a shackle 42 of padlock 40, as shown in FIG. 4, which conveniently may be passed therethrough. Although the space between arms 28 may vary to some extent, it must be sufficient to permit insertion of lug member 30 therebetween, as illustrated in FIG. 5. A space of about $\frac{1}{2}$ in. to $\frac{5}{8}$ in. is usually satisfactory to accomodate second lug member 30 of about $\frac{3}{8}$ in. thickness. The two lug members 26 and 30, when joined together, are disposed at the opposite end of hinge means 20.

Cap cover 10 may be readily installed on the top portion of a threaded filler pipe neck of a truck fuel tank. As most of the trucks in the United States are equipped with fuel tank necks of a relatively large outside diameter of about $4\frac{1}{4}$ in. and caps therefor of outside diameter of about $5\frac{1}{8}$ in., a cap cover 10 having outside diameter of 6 in., a height of its side wall 24 of $1\frac{3}{8}$ in. and outside diameter of base ring 12 the same as that of cap cover 10 is generally satisfactory. The inside diameter of base ring 12 of $4\frac{1}{2}$ in. is sufficient to pass it around neck 48 of fuel tank 50. It will be understood that the inside diameter of cover 16 must be somewhat larger than the outer diameter of a cap to be covered. Although the thickness of base ring 12 may vary somewhat, a $\frac{1}{8}$ in. thick base ring 12 is usually satisfactory.

The protective lockable security cap cover of the invention is likewise adaptable to fuel tank filler pipes of smaller outside diameter than described hereinabove. When the inside diameter of base ring 12 is at least $\frac{1}{2}$ in. larger than the outside diameter of filler pipe neck 48, an auxiliary adjustment ring 44, illustrated in FIGS. 3 and 6 is provided for insertion between base ring 12 and threaded cap 46 thereby filling the space between the inner perimeter of base ring 12 and the outer perimeter of cap 46 by forming a tight seal therebetween. Adjustment ring 44 having an outside diameter of about 5 in., a circular opening of a diameter slightly larger than the outside diameter of neck 48, for example $3\frac{1}{2}$ in. and a thickness of about $\frac{1}{8}$ in. should be satisfactory for all sizes of commercial truck fuel tank necks smaller than those having the customary outside diameter of $4\frac{1}{4}$ in., for example necks having outside diameter of $3\frac{5}{8}$ in. with caps having outside diameter of $3\frac{3}{4}$ in.

While the cap cover of the present invention may be manufactured from any appropriate rigid metal by any of the well known procedures, such as casting or stamping, it may also be made from a suitable plastic material by any of the known molding methods to form one-piece rigid and sturdy final product.

It will be apparent from the foregoing description that I have devised an improved protective means for fuel tanks which is useful to trucking companies having a large fleet of vehicles, as well as to independent truckers, subject to frequent steeling of gasoline or other liquid fuel from their truck tanks while at rest on overnight lay-overs by dishonest individuals equipped with hoses and high-speed pumps adapted for siphoning off quickly fuel from an unprotected tank. An additional advantage to large companies is that a padlock employed in conjunction with my invention may be provided with a master key useful to lock or unlock all cap covers fitted over necks of the fuel tank filler pipes in the entire fleet.

The cap cover may be installed on a fuel tank neck very quickly, in a manner of a minute or two by simply unscrewing the cap, placing the base ring over the upper portion of filler pipe's neck and the adjustment ring, if necessary, over the upper surface of the base ring in the same plane therewith, screwing the cap back in its place, closing the cap cover, passing a shackle of the padlock through the openings in both lug members and locking the padlock. It will be noted that no tools of any kind are required for the installation of my device, as it does not include any tightenable straps, screws or the like fastening elements. The cap cover is characterized by a combination of elements which are advantageous for achieving its basic function, i.e. prevention of fuel theft from trucks which causes very substantial losses in the trucking industry.

While the invention has been described in connection with truck fuel tanks, it is likewise applicable to other types of motor vehicles, such as vans, buses, boats, as well as large size liquid fuel storage tanks. In all forms of the invention, the cap cover is maintained firmly in the fixed closed position on the neck of a fuel tank so that tampering or unauthorized removal of fuel is virtually impossible.

It will be understood that various modifications in the form or in the constructional details of the invention as herein described may be made without departing from the spirit thereof or the scope of the claims which follow.

I claim:

1. A cap cover adapted to be fitted freely over a neck of upper portion of a fuel tank filler pipe of a truck to prevent unauthorized withdrawal of fuel from said tank, comprising:

a one-piece base ring including a large central aperture therein, said central aperture having a diameter larger than the exterior diameter of said filler pipe and smaller than the exterior diameter of a filler pipe cap;

an annular cover including a flat, circular top wall and a cylindrical side wall extending at a right angle relative to said top wall and hingedly secured directly to said base ring, the outside diameter of said side wall being substantially equal to the outside diameter of said base ring;

a first U-shaped lug member secured to said base ring and projecting outwardly therefrom comprising a pair of spaced, parallel vertically disposed arms;

a second lug member secured to said side wall of said annular cover projecting outwardly therefrom and adapted for insertion into space between said arms of said first lug member; and an opening in each of said arms of said first lug member and in the second lug member, thereby forming three openings aligned to receive a padlock shackle when said cap cover is in the closed position, whereby a secure, tight closure for said tank is provided, said cap cover being secured to the fuel tank filler pipe by said filler pipe cap.

2. The cap cover of claim 1 wherein the diameter of the aperture in said base ring is slightly larger than the outside diameter of said filler pipe.

3. The cap cover of claim 1 wherein the height of said side wall is somewhat greater than the height of a cap to be covered.

4. The cap cover of claim 1 wherein a hinge means is secured to said base ring and to said side wall of said annular cover at the opposite end of said first and second lug members when said cap cover is in the closed position.

5. The cap cover of claim 1 wherein the inside diameter of said annular cover is somewhat greater than the outer diameter of said cap.

6. The cap cover of claim 1 wherein a padlock passed through said aligned openings in said lug members locks said cap cover when fitted over the neck of said fuel tank filler pipe.

7. The cap cover of claim 1 wherein an auxiliary adjustment ring having a circular opening therein of a diameter slightly larger than the outer diameter of said neck is provided to fill in the space between the inside diameter of said base ring and the outside diameter of said cap.

8. The cap cover of claim 7 wherein said adjustment ring is positioned on the upper surface of said base ring in the same plane therewith.

9. The cap cover of claim 1 wherein said first U-shaped lug member comprises a base plate extending inwardly from the bottom portion of the U underneath said base ring and secured by rivets thereto.

10. The cap cover of claim 1 wherein the arms of said first U-shaped lug member are arranged in parallel relationship to each other.

11. The cap cover of claim 1 wherein said arms of said U-shaped lug member are sufficiently spaced from each other to permit insertion of said second lug member therebetween.

12. The cap cover of claim 1 wherein said first lug member and said second lug member form an integral part of said cover.

* * * * *